(12) United States Patent
Silamianos et al.

(10) Patent No.: US 7,273,336 B2
(45) Date of Patent: Sep. 25, 2007

(54) DIVIDER APPARATUS AND METHOD FOR USE WITH A BED OF A MOTOR VEHICLE

(75) Inventors: Bill M. Silamianos, Sterling Heights, MI (US); Jeffrey M. Aftanas, Ortonville, MI (US); Donald L. Muñoz, Bloomfield Hills, MI (US)

(73) Assignee: JAC Products, Saline, MI (US)

( * ) Notice: Subject to any disclaimer, the term of this patent is extended or adjusted under 35 U.S.C. 154(b) by 162 days.

(21) Appl. No.: 10/979,872

(22) Filed: Nov. 2, 2004

(65) Prior Publication Data

US 2005/0152761 A1 Jul. 14, 2005

Related U.S. Application Data

(60) Provisional application No. 60/516,932, filed on Nov. 3, 2003.

(51) Int. Cl.
*B60P 7/08* (2006.01)

(52) U.S. Cl. .................. 410/135; 410/129; 410/130

(58) Field of Classification Search ............... 410/129, 410/130, 132–142, 118; 220/530, 531, 541–545; 296/37.6; 224/42.33, 42.34
See application file for complete search history.

(56) References Cited

U.S. PATENT DOCUMENTS

| | | | |
|---|---|---|---|
| 4,103,956 A | 8/1978 | Faulstich | |
| 4,303,367 A | 12/1981 | Bott | |
| 4,717,298 A | 1/1988 | Bott | |
| 4,733,899 A | 3/1988 | Keys | |
| 4,834,599 A | 5/1989 | Gordon et al. | |
| 4,917,429 A | 4/1990 | Giger | |
| 5,035,184 A | 7/1991 | Bott | |
| 5,044,682 A | 9/1991 | Wayne | |
| 5,207,472 A | 5/1993 | Gower | |
| 5,265,993 A | 11/1993 | Wayne | |
| 5,340,004 A | 8/1994 | Moore | |
| 5,520,314 A | 5/1996 | Tkachuk | |
| 5,845,953 A | 12/1998 | Rusnock | |
| 5,975,819 A * | 11/1999 | Cola | ................. 410/129 |
| 6,015,178 A | 1/2000 | Haack | |
| 6,089,804 A | 7/2000 | Bartelt | |
| 6,170,724 B1 | 1/2001 | Carter et al. | |
| 6,206,624 B1 | 3/2001 | Brandenburg | |
| 6,467,663 B1 | 10/2002 | Kmita et al. | |
| 6,478,356 B1 | 11/2002 | Wayne | |
| 6,513,688 B2 | 2/2003 | Kmita et al. | |

(Continued)

*Primary Examiner*—Stephen Gordon
(74) *Attorney, Agent, or Firm*—Harness, Dickey & Pierce, P.L.C.

(57) ABSTRACT

A truck bed divider apparatus for use with a bed of a pickup truck or other cargo carrying bed of a motor vehicle. The apparatus includes one or more divider assemblies that may be lowered into an operative position to restrain the movement of smaller cargo items being carried in the bed. The divider assembly may also be moved into a raised position thereby allowing the full volume of the cargo area to be used if needed. A plurality of movable screens are incorporated in the divider assembly that allow very long cargo items to be accommodated even while the divider assembly is in its lowered position. The pivot assemblies can also be moved and positioned as needed along a pair of support rails disposed on opposing sidewalls of the cargo bed to better restrain articles of various shapes and sizes.

16 Claims, 8 Drawing Sheets

U.S. PATENT DOCUMENTS

| | | |
|---|---|---|
| 6,540,123 B1 | 4/2003 | Kmita et al. |
| 6,543,975 B2 | 4/2003 | Kopperud |
| 6,626,624 B1 | 9/2003 | Kopperud |
| 6,629,807 B2 | 10/2003 | Bernardo |
| 6,722,541 B1 | 4/2004 | Aftanas et al. |

* cited by examiner

DIVIDER APPARATUS AND METHOD FOR USE WITH A BED OF A MOTOR VEHICLE

PRIORITY INFORMATION

The present application claims priority from U.S. provisional application Ser. No. 60/516,932, filed Nov. 3, 2003, entitled "DIVIDER APPARATUS AND METHOD FOR USE WITH A BED OF A MOTOR VEHICLE" the entire contents of which are incorporated by reference herein.

FIELD OF THE INVENTION

This invention relates to an apparatus for dividing the space of a bed of a motor vehicle into a plurality of compartments and, more particularly, to a divider apparatus which is able to be adjustably positioned with a bed of a motor vehicle, such as a pickup truck, to divide the bed into a plurality of useful storage areas.

BACKGROUND OF THE INVENTION

Present day motor vehicles such as pickup trucks include a bed for carrying cargo of widely ranging sizes and shapes. For smaller items of cargo, however, it is desirable to restrain such items from movement within the bed so that the articles do not move or slide around within the bed during use of the vehicle. Previous mechanisms for this purpose have met with varying degrees of success. However, what is needed is a bed divider that can be positioned within the truck bed and move easily between a plurality of positions within the bed to fit cargo or articles of varying shapes and sizes. Even more particularly, what is needed is a divider that can be adjustably positioned at an infinite number of positions within the truck bed, and that also can be quickly and easily moved out of the way to allow very large items, such as lumber, plumbing tubing, etc., to be easily loaded and carried within the truck bed without interference from the bed divider.

SUMMARY OF THE INVENTION

The present invention is directed to a divider apparatus for use with a bed of a motor vehicle. In one preferred form, the divider apparatus is especially well suited for use within a bed of a pickup truck. The divider apparatus includes a divider assembly having first and second opposing ends. The first and second opposing ends are each secured to an associated pivot assembly. Each pivot assembly is secured to an associated support rail. The support rails are secured within the sidewalls of the bed of the vehicle in facing relationship to thus form support rails. The pivot assemblies can be fixedly secured at an infinite number of positions along the support rails so that the divider apparatus can be used to restrain cargo of varying shapes and sizes.

The pivot assemblies further allow the divider assembly to be pivoted from a first position wherein the divider assembly is positioned generally perpendicular relative to a bottom wall of the bed, to a second position wherein the divider assembly is positioned above and generally parallel to the bottom wall. In the first position the divider assembly functions as a cargo restraining apparatus. In the second position the divider assembly is positioned above the bottom wall to allow elongated items to be easily carried within the bed without interference from the divider apparatus.

In one preferred embodiment, the divider assembly includes at least a pair of independent screens. The screens are supported on a pair of parallel tracks that allow the screens to be moved slidably relative to one another. The screens allow the bed of the vehicle to be further subdivided such that the divider assembly can be secured in its first position and still allow very long items to be loaded into the bed without interference from the divider assembly, while forming a restraining wall for only a portion of the bed. Thus, both large, elongated items and smaller cargo can be carried in the bed with the smaller cargo items being independently restrained by the divider assembly.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
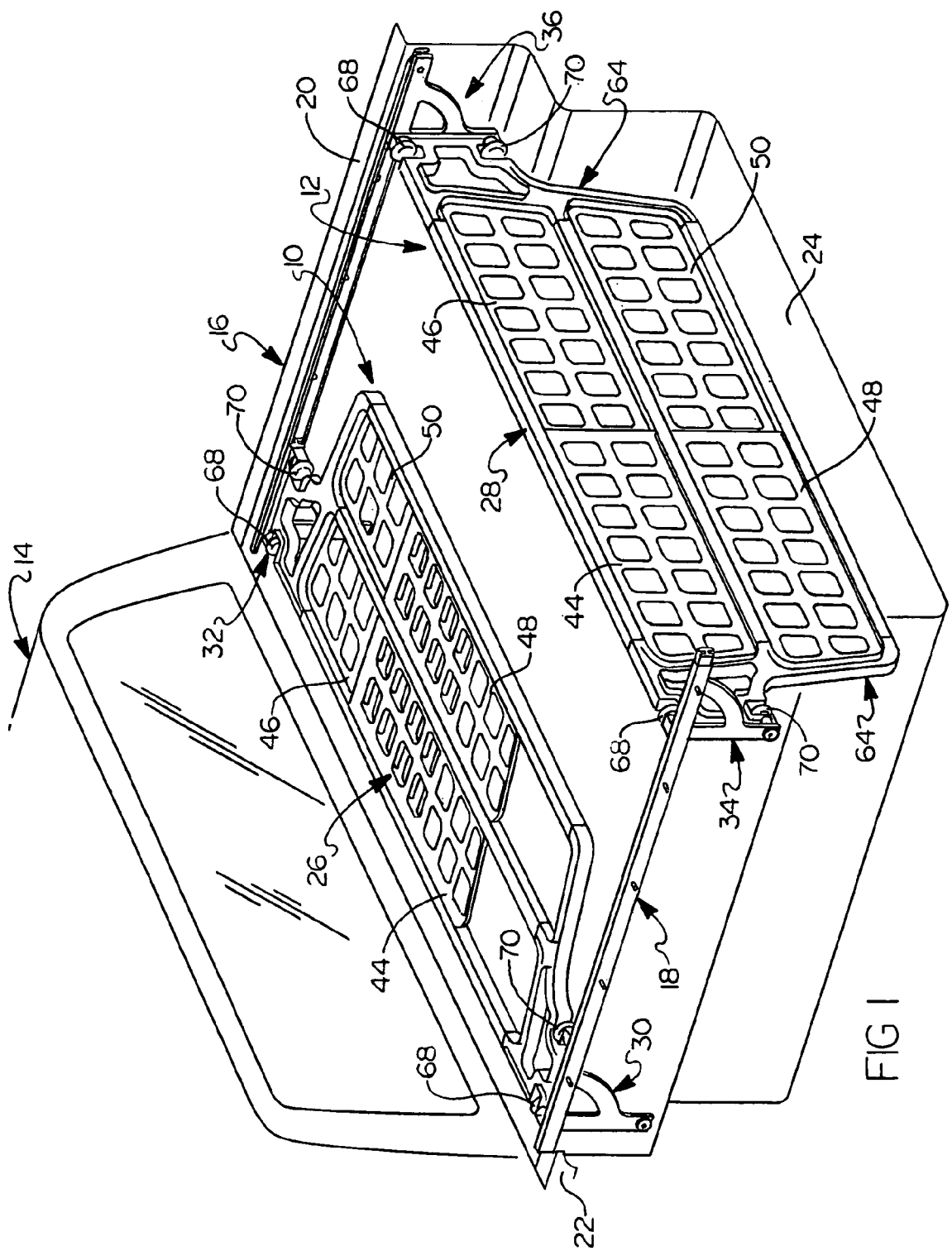
FIG. 1 is a perspective view of a divider apparatus in accordance with a preferred embodiment of the present invention disposed within a bed of a pickup truck.

Referring to FIG. 1, there is shown a divider apparatus 10 in accordance with a preferred embodiment of the present invention. The divider apparatus 10 is disposed within a truck bed 12 of a motor vehicle 14, such as pickup truck. However, it will be appreciated that the divider apparatus 10 could be used with any motor vehicle employing a cargo area in which a variety of articles of different sizes and shapes are to be stored during transportation. Thus, the divider apparatus 10 is just not limited to use with pickup trucks, but can be used with virtually any form of vehicle where it would be useful to restrain articles of various sizes and shapes within a cargo area.

The divider apparatus 10 includes a pair of support rails 16 and 18 which are fixedly secured, such as by threaded fasteners (not shown), to a pair of sidewalls 20 and 22 of the vehicle. The support rails 16 and 18 are further disposed such that they are in facing relationship. Each of the support rails 16 and 18 essentially forms a U-shaped channel. The support rails 16 and 18 are further disposed near upper edges of the sidewalls 20 and 22 and above a bottom wall 24 of the truck bed 12.

Between the support rails 16 and 18 is a first divider assembly 26 and a second divider assembly 28. The first divider assembly 26 is supported for pivotal movement, as well as movement along the support rails 16 and 18, by a first pivot mechanism 30 and a second pivot mechanism 32. Similarly, the second divider assembly 28 is supported by first pivot mechanism 34 and second pivot mechanism 36 for pivotal movement as well as sliding movement along the support rails 16 and 18. It will be appreciated immediately, however, that while two divider assemblies 26 and 28 are shown in FIG. 1, a lesser or greater plurality of divider assemblies could be employed.

Each of the divider assemblies 26 and 28 are movable between the two positions shown in FIG. 1. If a relatively large number of small items are to be carried in the bed 12, then it would advantageous to place both of the dividers 26 and 28 in the position in which divider assembly 28 is shown, that being its lowered position. However, if longer cargo items such as lumber are to be carried in the bed 12, then it would advantageous to place both of the divider assemblies 26 and 28 in the raised position in which divider assembly 26 is shown.

Figure 2:
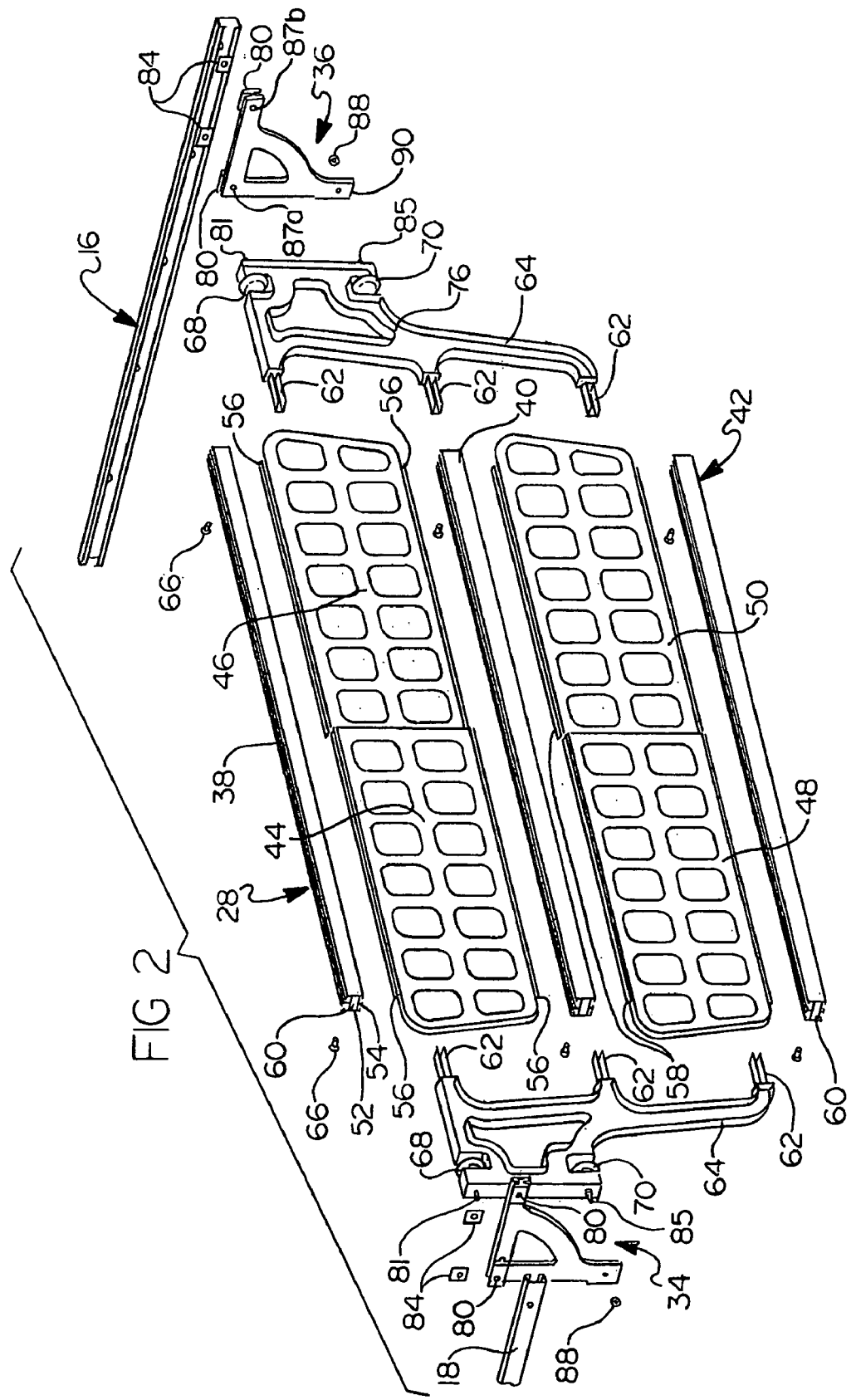
FIG. 2 is an exploded perspective view of a portion of the divider apparatus.
Figure 5:
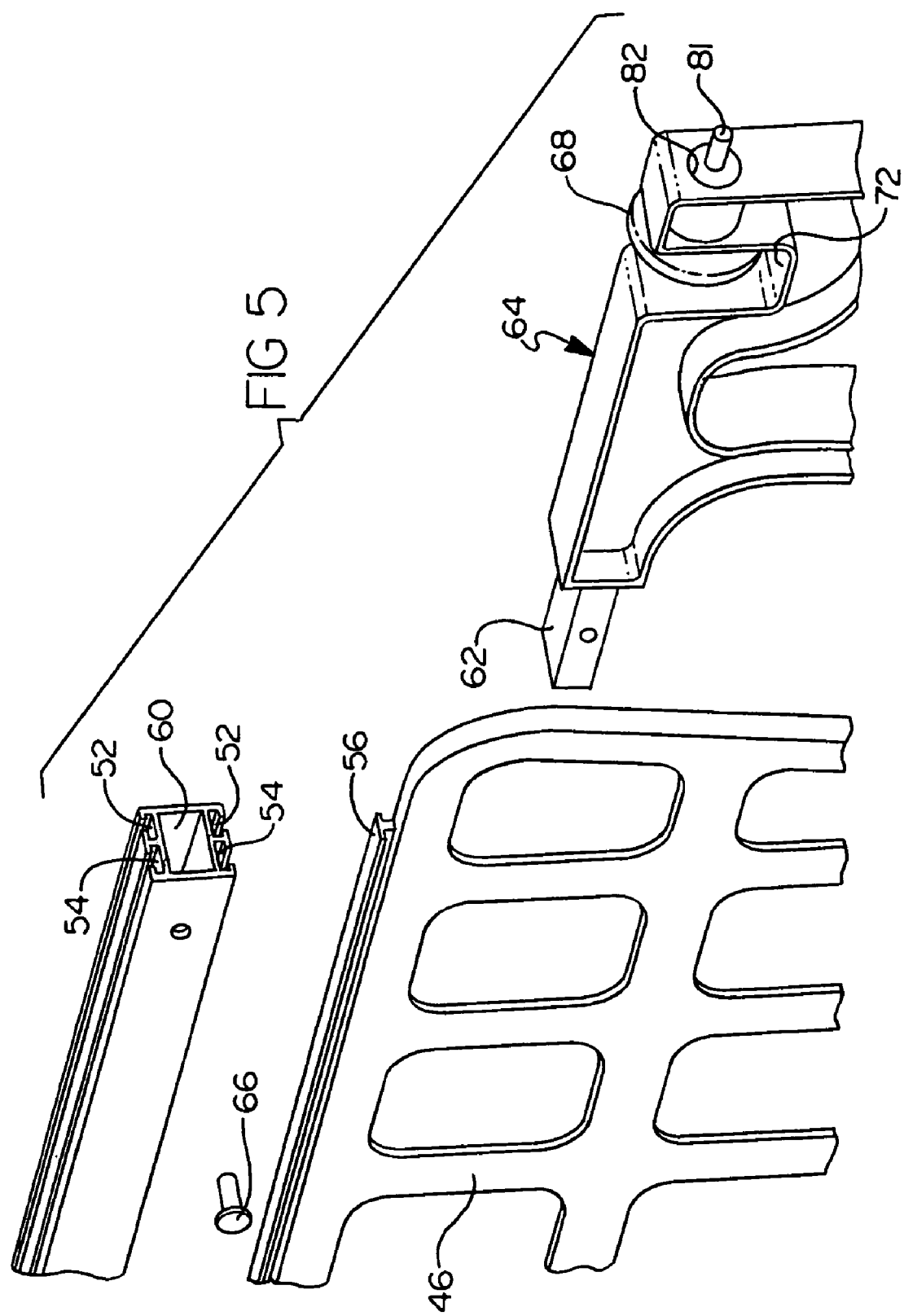
FIG. 5 is an exploded perspective view of an upper corner of the divider assembly of FIG. 4.

Referring to FIGS. 2 and 5, the construction of divider assembly 28 and its associated pivot assemblies 34 and 36 will be described in greater detail. It will be appreciated that divider assembly 26 and pivot assemblies 30 and 32 are identical in construction to divider assembly 28 and pivot assemblies 34 and 36, and thus only divider assembly 28 and the pivot mechanisms 34 and 36 will be described in detail. It will also be appreciated that pivot mechanisms 30-36 are all identical in construction.

The divider assembly 28 is comprised of tracks 38, 40 and 42. Between tracks 38 and 40 are disposed a pair of panels in the form of upper screens 44 and 46. Between tracks 40 and 42 are disposed a pair of panels in the form of lower screens 48 and 50. Each of tracks 38, 40 and 42 include two pairs of laterally adjacent channels 52 and 54, with one pair being disposed above the other, as best seen in FIG. 5. Upper screens 44 and 46 each have T-shaped edges 56 (FIG. 5) that enable each of the upper screens 44 and 46 to be captured within the channels 52 and 54 in side-by-side fashion. Since channels 52 and 54 are positioned next to one another, the upper screens 44 and 46 are able to slide in the tracks 52 and 54 independently of each other. This enables openings to be formed in the divider assembly 28 even when the divider assembly is in its lowered position as shown in FIG. 1. Lower screens 48 and 50 are constructed identically to upper screens 44 and 46 and thus include T-shaped edges 58 that are also captured within the channels 52 and 54 of tracks 40 and 42. Accordingly, lower screens 48 and 50 can be moved slidably to extend substantially the full width of the truck bed 12 or positioned one in front of the other to allow an opening to be formed in the lower half of the divider assembly 28 for longer cargo items.

With further reference to FIGS. 2 and 5, each of the tracks 38, 40 and 42 includes a central channel 60 that receives a neck 62 of a frame component 64. Conventional threaded fasteners 66 or any other suitable fastening means may be used to secure the tracks 38, 40 and 42 to their respective necks 62 to hold the divider assembly 28 in the fully formed position shown in FIG. 1.

Figure 3:
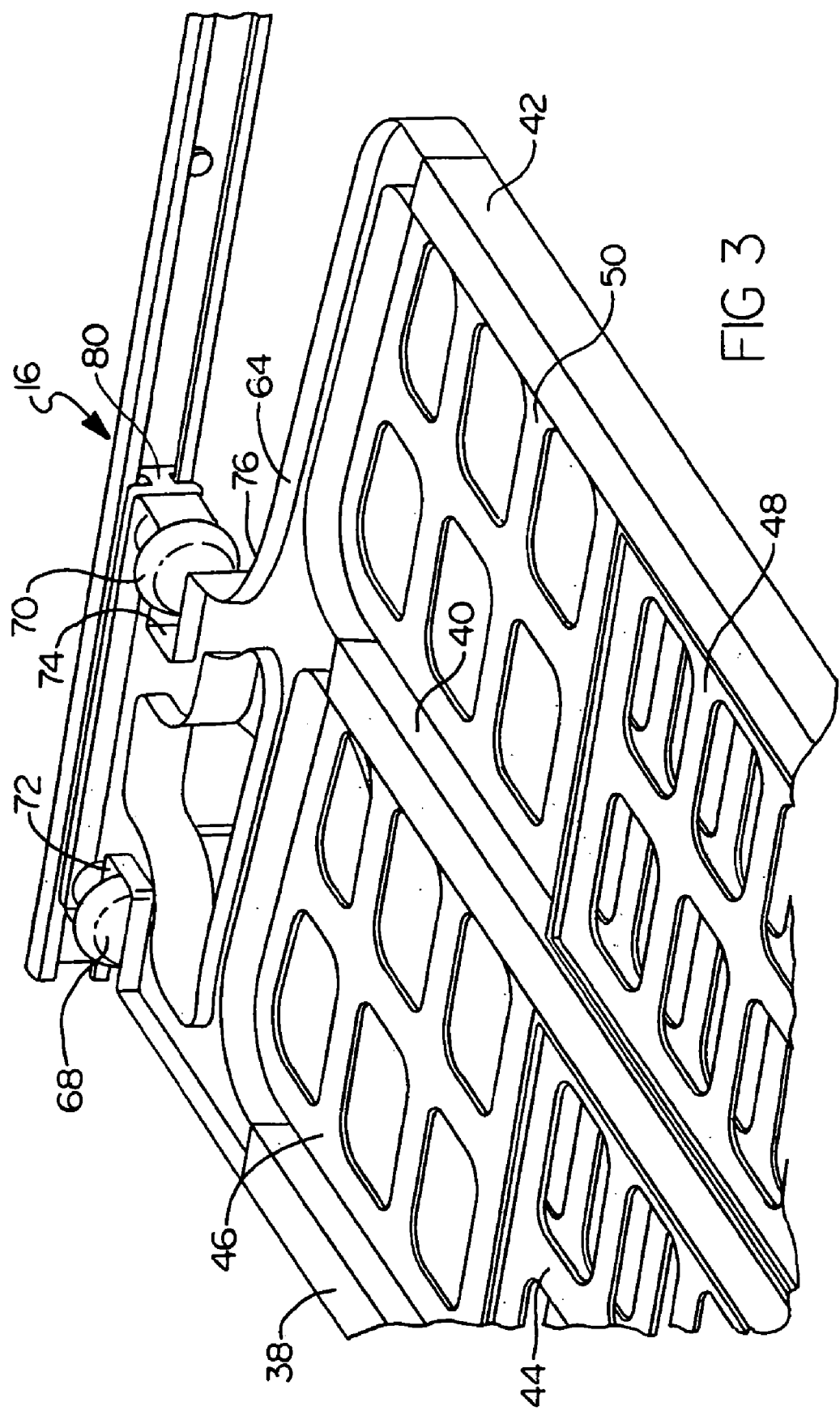
FIG. 3 is an enlarged perspective view of one corner of the divider apparatus showing the divider assembly in its raised position.
Figure 4:
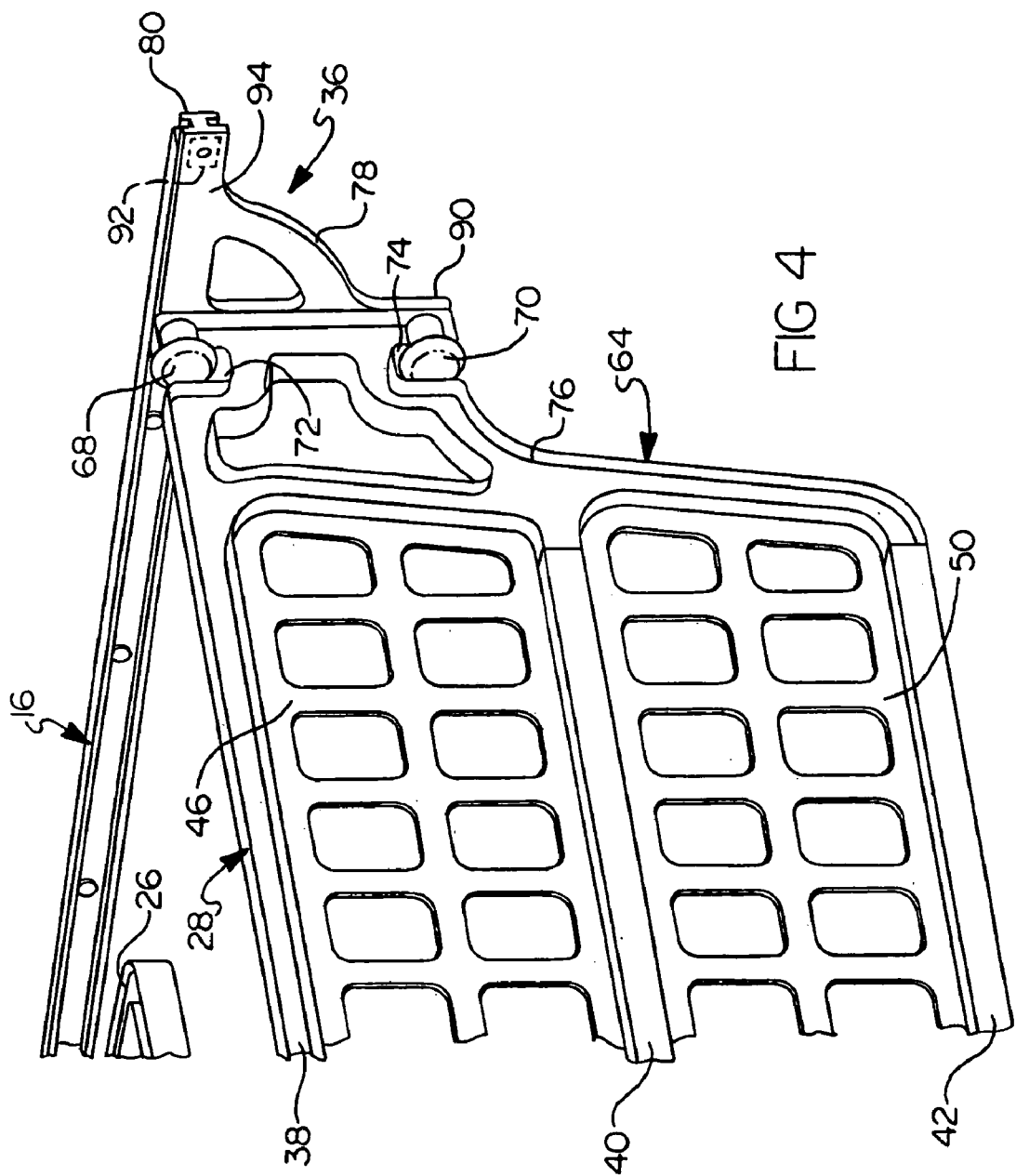
FIG. 4 is a view of the divider apparatus of FIG. 3 but with the divider assembly in the lowered position.

With further reference to FIGS. 2-4, each of the frame components 64 include a manually engagable locking wheel 68 and manually engagable securing wheel 70. Each of the wheels 68 and 70 are disposed within respective slots 72 and 74 formed in the frame component 64. Frame component 64 further has a curving area 76 to allow it to clear a wheel well (not shown) in the truck bed 12, as is common with the construction of pickup truck beds.

Each of wheels 68 and 70 are secured to a pivot mechanism 78. The pivot mechanism 78 includes a plurality of spaced apart T-lugs 80 that ride within the channel of the support rails 16. Thus, the pivot mechanism 68 is slideably supported on the support rail 16.

With further reference to FIGS. 2, 4 and 5, the locking wheel 68 includes a threaded shaft 81 that extends through an opening 82 (best seen in FIG. 5) in the frame component 64, through an opening 87*a* in its associated pivot assembly 34 or 36, and engages a threaded tap plate 84 (FIG. 2) disposed within the support rail 16. Securing wheel 70 also includes a threaded shaft 85 that projects through an opening 86 (FIG. 2) in the frame component 64, through opening 87*b* in its associated pivot assembly, to engage a threaded nut 88 disposed within a lower arm 90 of pivot mechanism 78. Thus, when it is desired to leave the pivot assembly 28 in its lower position as shown in FIG. 1, then wheel 70 is threadably engaged with the nut 88, which restrains the pivot assembly 28 in a vertical orientation within the truck bed 12. Actuating wheel 68 can be tightened to thus lock the divider assembly 28 in any desired position along support rail 16. Alternatively, it may be loosened to permit the divider assembly 28 to be moved slidably along the rail 16 and re-secured at a different position.

In the event that it is desired to rotate the divider assembly 28 to the position of divider assembly 26 in FIG. 1 (i.e., to a horizontal position above the bottom wall 24 of the truck bed 12), then securing wheel 70 is manually rotated to unthread it from nut 88. The entire divider assembly 28 is then pivoted up to the position of divider 26 in FIG. 1. The securing wheel 70 is then re-secured to a second tap plate 92 disposed at an upper arm 94 of the pivot mechanism 78. It will be appreciated that nut 88 shown in FIG. 2 may be secured within a recess (not shown) in the lower arm 90 of the pivot mechanism 78 or by any other suitable means. Alternatively, it will be appreciated that a biasing spring could readily be incorporated with the wheel 70 so that simply pulling the wheel out slightly away from lower arm 90 will allow the divider assembly 28 to be pivoted.

Figure 6:
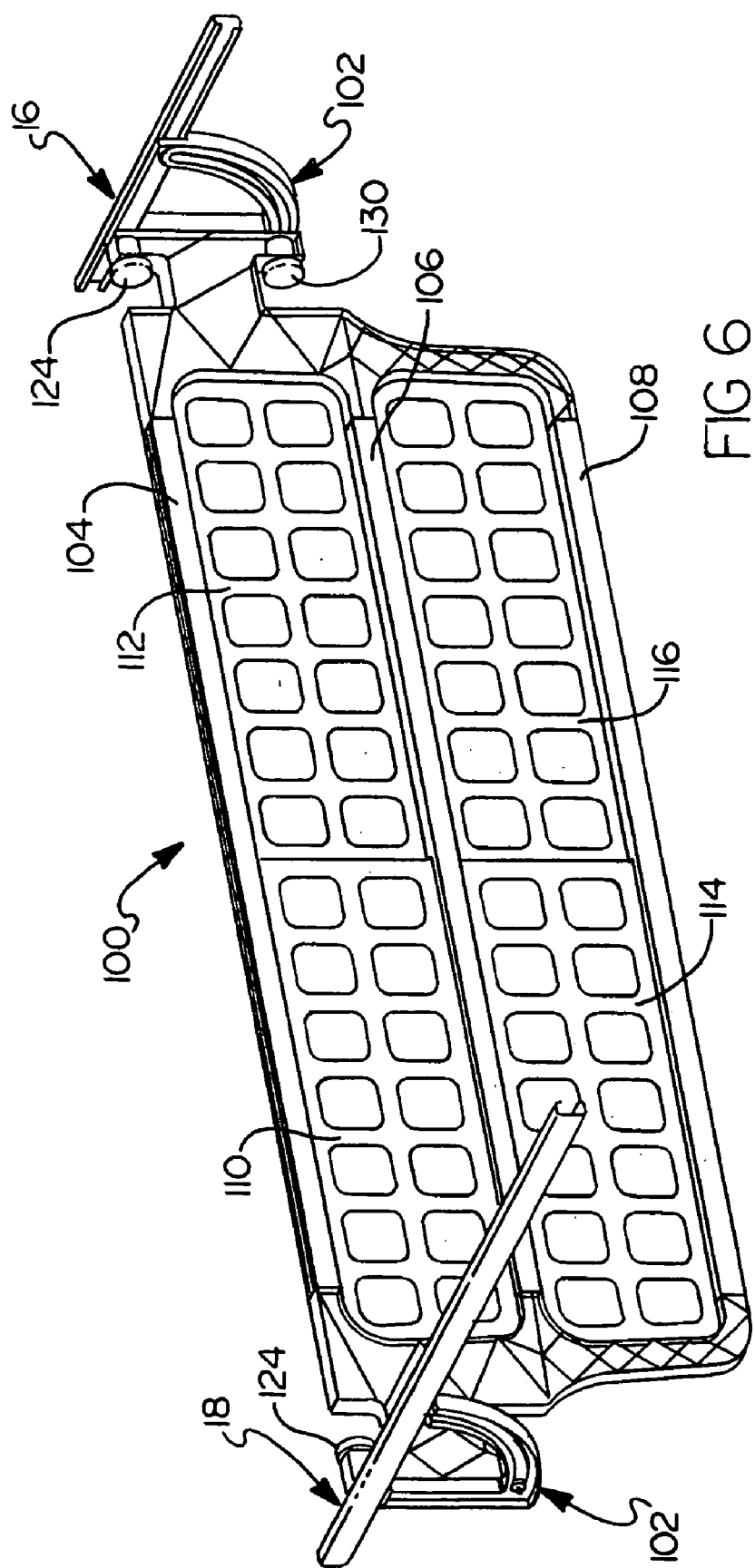
FIG. 6 is a perspective view of an alternative preferred embodiment of the divider apparatus of the present invention.
Figure 7:
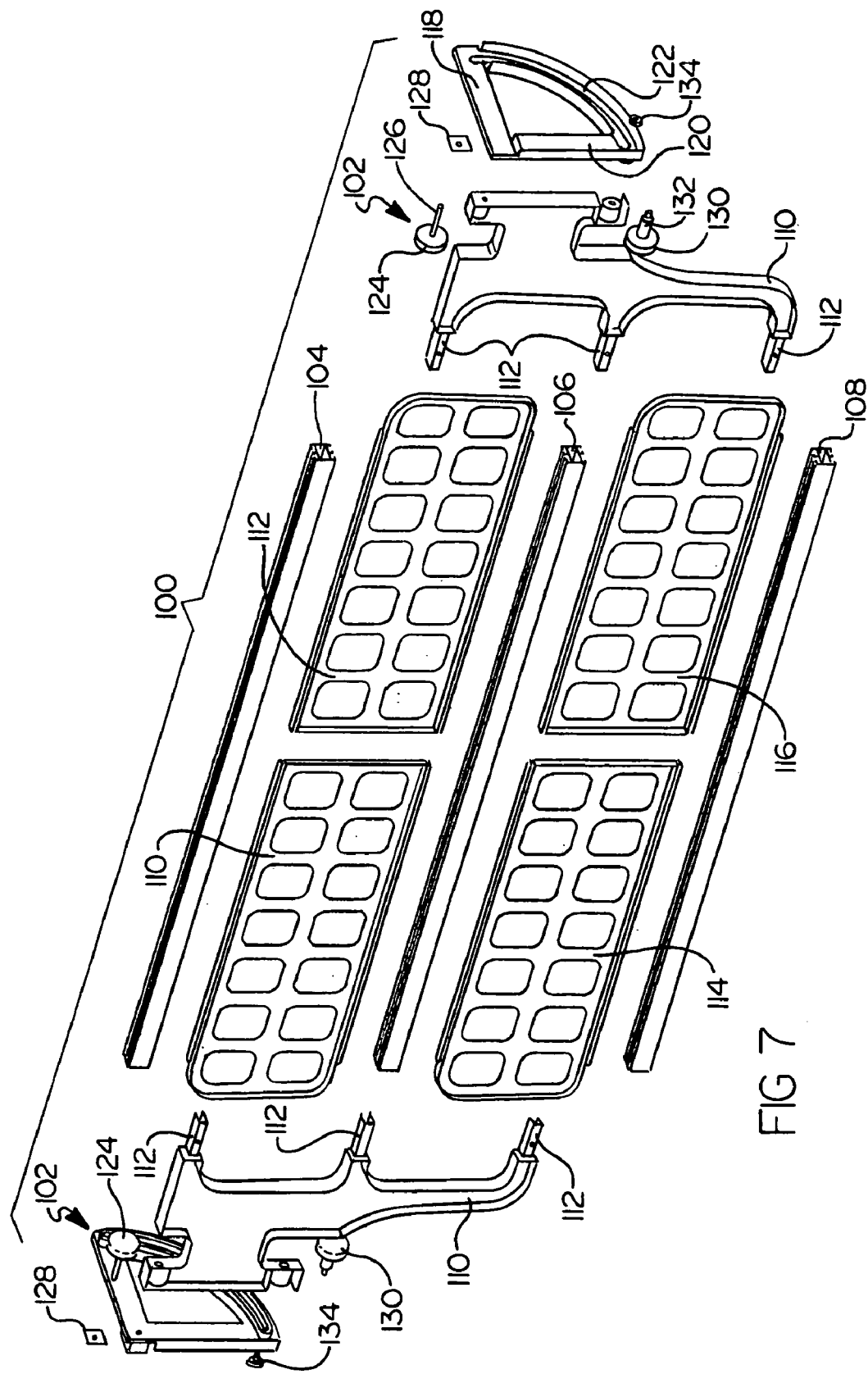
FIG. 7 is an exploded perspective view of the divider apparatus of FIG. 6.

With reference to FIGS. 6 and 7, a divider assembly 100 and a pair of pivot mechanisms 102 are illustrated in accordance with an alternative preferred embodiment of the present invention. This embodiment is similar to the divider assembly 28 of FIG. 1 with the principal exception of the construction of pivot mechanism 102. With specific reference to FIG. 7, the divider assembly 100 is formed with tracks 104, 106, and 108 which are identical to tracks 38, 40, and 42 shown in FIG. 2. Similarly, upper screens 110 and 112 are disposed between the tracks 104 and 106 and a pair of lower screens 114 and 116 are disposed between the tracks 106 and 108. Frame members 110 have neck portions 112 that are coupled to the tracks 104, 106, and 108.

Figure 8:
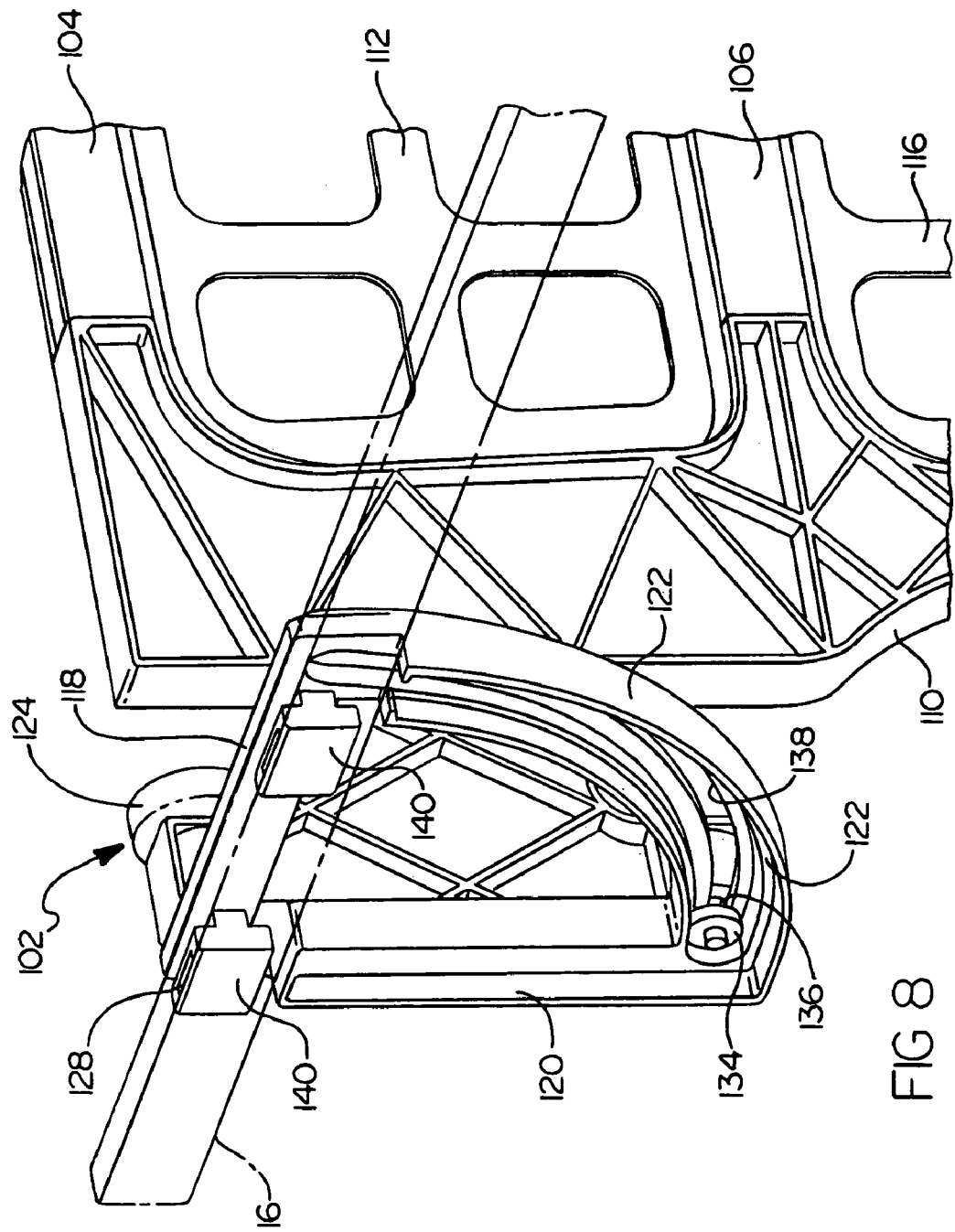
FIG. 8 is a perspective view of one corner of the divider apparatus of FIG. 6.

With further reference to FIGS. 7 and 8, each of the pivot mechanisms 102 include an upper portion 118, a side portion 120 and an arcuate connecting track 122. Track 122 is shown in detail in FIG. 8. An upper wheel 124 has a threaded shaft 126 that projects through a threaded opening of a conventional tap plate 128 that is disposed within support rail 16 of FIG. 1. Wheel 130 also includes a threaded shaft 132 which engages with a lock nut 134 to clamp the entire pivot assembly 100 in its lowered position or in its raised position. The locking nut 134 is shown in greater detail in FIG. 8. The locking nut 134 includes a body portion 136 that extends through a slot 138 in the track 122 to thus prevent it from rotating as the wheel 130 is loosened or tightened rotationally.

With further reference to FIG. 8, the upper portion 118 of the pivot mechanism 102 has conventional T-lugs 140 that allow it to be supported from the channel of support rail 16.

Tightening the wheel 126 causes the pivot mechanism 102 to be clamped at a desired position along the support rail 16. Loosening the wheel 124 allows the entire pivot mechanism 102 to be moved slideably along the support rails 16 and repositioned as needed.

The various preferred embodiments of the present invention thus provide a means to restrain a wide variety of cargo items having various shapes and sizes within a cargo bed of a vehicle. Although the present invention is particularly well adapted for use with pickup trucks, it will be appreciated that the invention could just as readily be implemented within a cargo area of a support utility vehicle or any other type of motor vehicle having a cargo area capable of accommodating articles of various sizes and shapes. Advantageously, the divider assemblies 26 and 100 described herein allow elongated items to be readily accommodated in the bed 12 while the divider assembly is in its lowered position, and thus also able to simultaneously restrain movement of other smaller articles that are also positioned adjacent to the longer cargo items. The present invention thus provides a large degree of functionality in restraining articles of various sizes and shapes in a bed. A particular advantage of the present invention is that divider assemblies 26 and 28, as well as divider assembly 100, can be readily raised into a position that places each substantially at the upper edge of the sidewalls 20 and 22 of the truck bed 12 to thus allow the entire volume of the truck bed to be used if needed.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A divider apparatus for the bed of a motor vehicle for use in restraining articles being carried in the bed, wherein the bed has facing, opposing side walls and a bottom wall in between the side walls, the divider apparatus comprising:
   first and second support rails adapted to be fixedly secured to the bed sidewalls so as to be in facing relationship with one another;
   a divider assembly having first and second end portions;
   a first pivot mechanism supported from said first end portion of said divider assembly and movably coupled to said first support rail;
   a second pivot mechanism supported from said second end portion of said divider assembly and movably coupled to said second support rail;
   said first and second pivot mechanisms enabling said divider assembly to pivot from a first position, wherein said divider assembly rests perpendicular to said bottom wall of said bed, to a second position wherein said divider assembly is positioned generally above and parallel to said bottom wall without requiring said pivot mechanisms to first be moved to an end of each said support rail; and
   each said pivot mechanism including a securing assembly for securing said divider assembly in each of said first and second positions.

2. The apparatus of claim 1, wherein said pivot mechanisms each include a locking assembly for releasably securing said divider assembly at a desired longitudinal position along said support rails.

3. The apparatus of claim 1, wherein said divider assembly includes first and second panels supported for sliding movement.

4. The apparatus of claim 1, wherein said divider assembly includes at least a first panel and a second panel supported elevationally below the first panel.

5. The apparatus of claim 1, wherein said divider assembly includes a first pair of panels moveable slidably relative to one another; and
   a second pair of panels supported below said first pair of panels, said second pair of panels also be supported slidably relative to one another.

6. The apparatus of claim 1, wherein said divider assembly includes:
   a pair of spaced apart support tracks disposed parallel to one another;
   a pair of panels supported for sliding movement in said support tracks;
   said panels being positionable in a first position overlaying one another and in a second position contiguous and adjacent one another.

7. The apparatus of claim 1, wherein said pivot mechanisms each include an arcuate slot for cooperating with locking structure to enable said divider assembly to be secured at a plurality of positions in between said first and second positions.

8. The apparatus of claim 1, wherein said securing assembly of each said pivot mechanism comprises:
   a first manually graspable member for securing said pivot mechanism fixedly relative to its associated said support rail; and
   a second manually graspable member for securing said divider assembly in a selected one of said first and second positions.

9. A divider apparatus for the bed of a motor vehicle for use in restraining articles being carried in the bed, wherein the bed has facing, opposing side walls and a bottom wall in between the side walls, the divider apparatus comprising:
   first and second support rails adapted to be fixedly secured to the bed sidewalls so as to be in facing relationship with one another;
   a divider assembly having first and second end portions;
   first pivot mechanism supported from said first end portion of said divider assembly and movably coupled to said first support rail;
   a second pivot mechanism supported from said second end portion of said divider assembly and movably coupled to said second support rail;
   said first and second pivot mechanisms enabling said divider assembly to pivot from a first position, wherein said divider assembly rests perpendicular to said bottom wall of said bed, to a second position wherein said divider assembly is positioned generally above and parallel to said bottom wall;
   each said pivot mechanism including a securing assembly for securing said divider assembly in each of said first and second positions; and
   wherein said divider assembly includes a pair of panels, with at least one said panel supported for movement along an axis perpendicular to said sidewalls such that said divider assembly can be selectively configured to form either;
   a complete barrier wherein said panels cooperate to extend a complete length between said pivot mechanisms, and
   a partial barrier in which said panels are positioned to at least partially overlap, to define both an opening for a first portion of said length between said pivot mechanisms and a barrier for a second portion of said length between said pivot mechanisms; and wherein said divider assembly can be configured to form either said complete barrier or said partial barrier without the need to pivot said divider assembly.

10. The apparatus of claim 9, wherein said divider assembly includes a pair of lower panels disposed elevationally below said panels for sliding movement.

11. The apparatus of claim 9, wherein said securing assembly of each said pivot mechanism comprises:
a first manually graspable member for securing said pivot mechanism fixedly relative to its associated said support rail; and
a second manually graspable member for securing said divider assembly in a selected one of said first and second positions.

12. The apparatus of claim 11, wherein each said pivot mechanism includes an arcuate slot for cooperating with an associated one of said manually graspable members to enable said divider assembly to be secured in a plurality of intermediate positions between said first and second positions.

13. The apparatus of claim 9, wherein each said securing assembly includes a manually graspable member operatively coupled to an associated one of said support rails for securing said divider assembly fixedly at a selected position along said support rails.

14. The apparatus of claim 13, wherein each said securing assembly includes a frame component, said frame component including an associated one of said manually graspable members, and wherein said associated one of said manually graspable members is operatively coupled to an associated tap plate disposed within an associated one of said support rails.

15. A divider apparatus for the bed of a motor vehicle for use in restraining articles being carried in the bed, wherein the bed has facing, opposing side walls and a bottom wall in between the side walls, the divider apparatus comprising:
first and second support rails adapted to be fixedly secured to the bed sidewalls so as to be in facing relationship with one another;
a divider assembly having first and second end portions;
a first pivot mechanism supported from said first end portion of said divider assembly and movably coupled to said first support rail;
a second pivot mechanism supported from said second end portion of said divider assembly and movably coupled to said second support rail;
said first and second pivot mechanisms enabling said divider assembly to pivot from a first position, wherein said divider assembly rests perpendicular to said bottom wall of said bed, to a second position wherein said divider assembly is positioned non-perpendicular to said bottom wall; and
said divider assembly including at least one panel supported for sliding movement when said divider assembly is in said first position, to enable said divider assembly to form at least a partial barrier within said bed.

16. The apparatus of claim 15, wherein said divider apparatus comprises first and second panels, with at least one of said first and second panels being supported for movement along an axis perpendicular to said sidewalls such that said divider assembly can be selectively configured to form either:
a complete barrier wherein said panels cooperate to extend a complete length between said pivot mechanisms, and
a partial barrier in which said panels are positioned to at least partially overlap, to define both an opening for a first portion of said length between said pivot mechanisms and a barrier for a second portion of said length between said pivot mechanisms; and
wherein said divider assembly can be configured to form either said complete barrier or said partial barrier without the need to pivot said divider assembly.

* * * * *